United States Patent
Eguchi et al.

(10) Patent No.: US 6,238,640 B1
(45) Date of Patent: May 29, 2001

(54) CONVERSION METHOD OF CARBON MONOXIDE AND CATALYST

(75) Inventors: Koichi Eguchi, Kasuga; Koshi Sekizawa, Onojo; Sei-ichi Yano, Sakai; Toshimasa Utaka, Fukuoka; Hiromichi Arai, deceased, late of Fukuoka, by Yukiko Arai, Miwa Arai, legal heirs; by Kanta Arai, legal heir, Yokohama, all of (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/306,800

(22) Filed: May 7, 1999

(30) Foreign Application Priority Data

Nov. 5, 1998 (JP) .................................................. 10-314203

(51) Int. Cl.⁷ ............................. C01B 31/20; C01B 3/16
(52) U.S. Cl. ....................................... 423/437.2; 423/656
(58) Field of Search ............................. 423/437.1, 437.2, 423/655, 656

(56) References Cited

U.S. PATENT DOCUMENTS

| | | | | |
|---|---|---|---|---|
| 3,961,037 | * | 6/1976 | Davies et al. | 423/656 |
| 4,126,581 | * | 11/1978 | Sugier et al. | 423/656 |
| 4,129,523 | * | 12/1978 | Snowden | 423/656 |
| 4,177,252 | * | 12/1979 | Chinchen | 423/656 |
| 4,721,611 | * | 1/1988 | Pinto et al. | 423/655 |
| 5,387,408 | * | 2/1995 | Schneider et al. | 423/656 |
| 5,980,857 | * | 11/1999 | Kapoor et al. | 423/648.1 |
| 5,990,040 | * | 11/1999 | Hu et al. | 502/342 |
| 6,019,954 | * | 2/2000 | Tang et al. | 423/437.2 |

* cited by examiner

*Primary Examiner*—Wayne Langel
*Assistant Examiner*—Christina Ildebrando
(74) *Attorney, Agent, or Firm*—Oblon, Spivak, McClelland, Maier & Neustadt, P.C.

(57) ABSTRACT

The invention provides a carbon monoxide conversion method for hydrogen-containing gas. The method comprises selective CO conversion in hydrogen-containing gas through contact of CO with steam and oxygen in the presence of a catalyst containing copper, alumina and zinc oxide.

18 Claims, 2 Drawing Sheets

CO CONVERSION VERSUS VARYING AMOUNT OF OXYGEN ADDED

CO CONVERSION VERSUS DIFFERENT CATALYSTS USED

CONVERSION METHOD OF CARBON MONOXIDE AND CATALYST

BACKGROUND OF THE INVENTION

1. Field of the Invention

The present invention relates to a method of carbon monoxide conversion and a method of hydrogen-containing gas production. More precisely, it relates to a CO conversion catalyst comprising copper, alumina and a metal oxide such as zinc oxide or the like, with which carbon monoxide in hydrogen-containing gas is converted into carbon dioxide and hydrogen in the presence of steam and oxygen, and to a method of carbon monoxide conversion and a method of hydrogen-containing gas production in which is used the catalyst.

2. Description of the Related Art

Known are various techniques of producing hydrogen through hydrocarbon reforming. In particular, many techniques of hydrocarbon reforming with steam have been industrialized. In these, used are nickel-based catalysts, with which methane, LPG, naphtha and others are processed to give hydrogen for petroleum refining. Techniques of partially oxidizing heavy hydrocarbons such as vacuum residues with oxygen to give hydrogen have also been industrialized. Recently, many studies have been made in using hydrogen as produced according to the hydrogen production methods noted above as the fuel for fuel cells, and are now being in industrialization stages.

In the hydrogen production methods, in general, carbon monoxide gas (CO gas) as produced in the first steam reforming reaction is converted into hydrogen and carbon dioxide in the next shift reaction. In particular, for fuel cells in which CO gas is a catalyst poison, CO gas must be fully removed from hydrogen. For that purpose, in general, CO-containing gas is oxidized with steam through high-temperature shift reaction and low-temperature shift reaction to thereby lower its CO content. JP-A 56-158147, JP-A 5-245376 and JP-A 64-27645 disclose copper-aluminium-zinc-based catalysts, copper-aluminium-magnesium-based catalysts and copper-aluminium-chromium-based catalysts for low-temperature shift reaction. However, the CO conversion is limited in the shift reaction with steam.

Known is an example of CO gas removal through low-temperature CO conversion with an oxidizing agent of oxygen (Soviet Union Patent, SU217383A790618). The CO gas removal method disclosed comprises high-temperature shift reaction followed by CO gas conversion with steam and oxygen, which is for increasing the degree of CO gas conversion and for increasing the yield of hydrogen. In the method, used is a zinc-chromium-copper-based catalyst in the CO conversion step that follows the high-temperature shift reaction step. They say that the catalyst is applicable to a gaseous system having a CO content of at most 1%. One preferred embodiment disclosed comprises removing carbon dioxide prior to the CO conversion step. Therefore, the method in the SU patent is defective in that the hydrogen-containing gas production step therein is complicated, and that the CO conversion therein is limited like in the shift reaction with steam (in Examples of the SU patent, the CO conversion is about 90%).

The invention has been made in consideration of the matters noted above, and its object is to provide a method of converting CO in a hydrogen-rich gas as generated in steam reforming of hydrocarbons or the like, with steam and oxygen into hydrogen and carbon dioxide to a high degree of CO conversion, to provide a method of hydrogen-containing gas production through CO conversion, and to provide a catalyst for CO conversion.

SUMMARY OF THE INVENTION

We, the present inventors have assiduously studied for solving the problems noted above, and, as a result, have found that a conversion catalyst comprising copper, alumina and a metal oxide such as zinc oxide or the like is suitable to CO conversion in hydrogen-containing gas with steam and oxygen. On the basis of this finding, we have completed the present invention.

Specifically, the invention is summarized as follows:

(1) A method of converting carbon monoxide into hydrogen and carbon dioxide, which comprises contacting carbon monoxide with steam and oxygen in the presence of a catalyst that contains copper, alumina and at least one metal oxide selected from zinc oxide, chromium oxide and magnesium oxide.

(2) A method for producing hydrogen-rich gas with a reduced carbon monoxide content, which comprises contacting a carbon monoxide-containing, hydrogen-rich gas with steam and oxygen in the presence of a catalyst that contains copper, alumina and at least one metal oxide selected from zinc oxide, chromium oxide and magnesium oxide.

(3) A catalyst containing copper, alumina and at least one metal oxide selected from zinc oxide, chromium oxide and magnesium oxide, which is for catalyzing carbon monoxide conversion into hydrogen and carbon dioxide through contact of carbon monoxide with steam and oxygen.

(4) The catalyst of (3), which contains copper, alumina and zinc oxide.

(5) The catalyst of (3) or (4), of which the copper content falls between 10 and 70% by weight.

(6) The catalyst of any one of (3) to (5), of which the metal oxide content falls between 0.2 and 0.8 in terms of the ratio by weight of the metal oxide to the total of alumina and the metal oxide in the catalyst.

Figure 1:
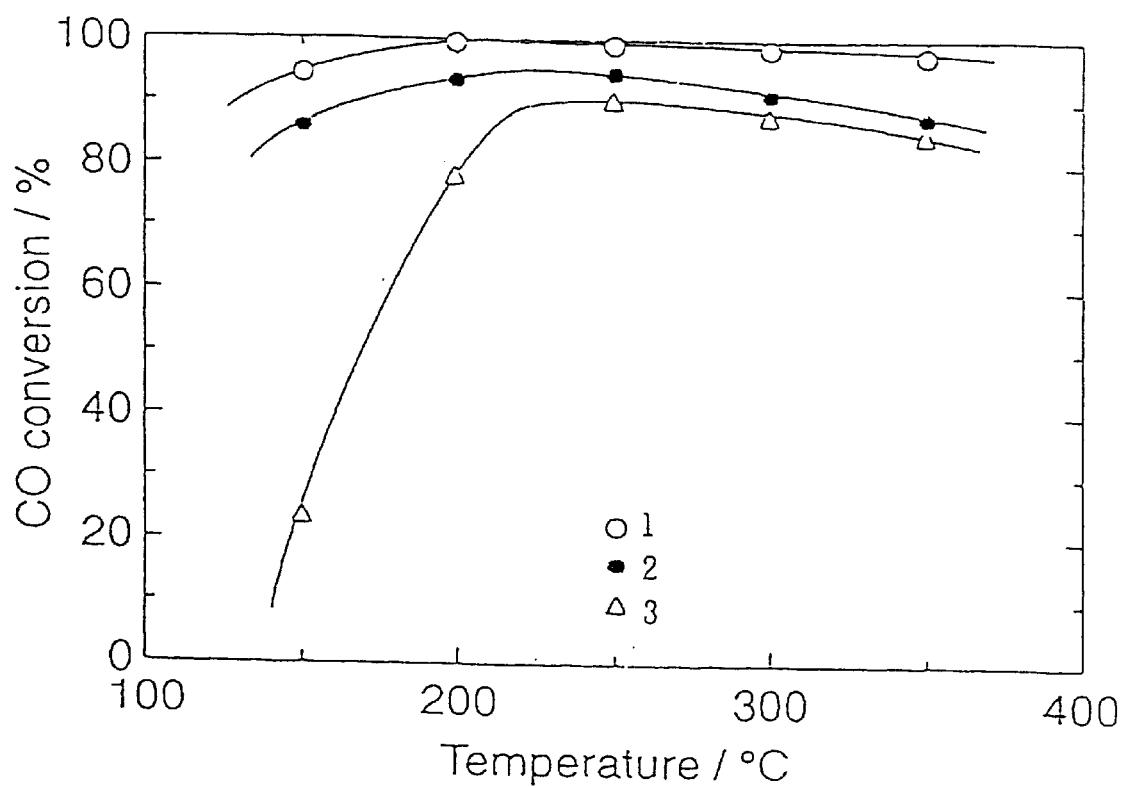
FIG. 1 is a graph of a temperature-dependent CO conversion versus a varying amount of oxygen added. This shows the data in Example 4, Example 5 and Comparative Example 1.

In the drawings, the reference numerals are as follows:
1: Example 4
2: Example 5
3: Comparative Example 2
4: Catalyst 1
5: Catalyst 2
6: Catalyst 3

DETAILED DESCRIPTION OF THE INVENTION

Embodiments of the invention are described below.

The invention provides a method of converting CO in hydrogen-rich gas into hydrogen and carbon dioxide, for which are used steam and oxygen. According to the method of the invention, gas consisting essentially of hydrogen and carbon monoxide and obtained through steam reforming or partial oxidation of hydrocarbons or methanol is processed with steam and oxygen for selectively oxidizing CO therein into hydrogen and carbon dioxide, thereby producing hydrogen-rich gas which contains little CO.

The outline of the process of one example of steam reforming of methane could be represented by the following chemical reaction formulae:

1) Hydrocarbon Reforming with Steam:

$$CH_4 + H_2O = 3H_2 + CO$$

$$CH_4 + 2H_2O = 4H_2 + CO_2$$

2) Selective CO Oxidation with Steam and Oxygen:

$$CO + H_2O = H_2 + CO_2$$

$$CO + \tfrac{1}{2}O_2 = CO_2$$

3) Unfavorable side reactions:

$$H_2 + \tfrac{1}{2}O_2 = H_2O$$

$$H_2 + CO_2 = CO + H_2O$$

Hydrocarbon reforming 1) is a step of producing CO-containing hydrogen-rich gas, which is the feedstock for the present invention. The hydrogen-rich gas generally contains $CO_2$, excess steam and non-reacted methane, in addition to CO. In the theory of chemical equilibrium, the CO content of the mixed gas of that type is higher at higher temperatures while the hydrogen and $CO_2$ content thereof is higher at lower temperatures. Therefore, it is advantageous to carry out the shift reaction at the lowest possible temperature. At low temperatures, however, CO conversion in the mixed gas into hydrogen and $CO_2$ will be difficult to be promoted in the theory of reaction rate, with the result that the CO content of the mixed gas could not be lowered to a satisfactory degree.

The method of the invention is suitable to CO conversion attainable at relatively low temperatures, and is characterized by the combination of selective CO oxidation with steam and selective CO oxidation with oxygen, the latter being for removing a minor amount of CO gas still remaining in the system, as in 2). The catalyst for use in the invention is to catalyze the CO conversion with steam and the selective CO oxidation with oxygen at relatively low temperatures. Processed with the catalyst, CO-containing hydrogen-rich gas could be converted into hydrogen-rich gas that contains little CO while the unfavorable side reactions of 3) are minimized as much as possible.

The catalyst, the CO conversion method and the hydrogen-rich gas production method of the invention are described below.

First mentioned is the catalyst of the invention.

The catalyst of the invention indispensably comprises three components of copper, alumina and a metal oxide. The metal oxide is at least one of zinc, chromium and magnesium oxides. The copper may be in any form of copper oxides or reduced copper. However, in the environment of CO conversion, it is believed that the copper is reduced and the reduced fine copper grains are dispersed and held on the alumina and the metal oxide to exhibit the catalytic capabilities.

Preferably, the copper content of the catalyst falls between 10 and 70% by weight, more preferably between 25 and 70% by weight, even more preferably between 25 and 35% by weight (in terms of the copper metal content). If the copper content is too small, the activity of the catalyst will be low; but if it is too large, the copper dispersion in the catalyst will be poor. Also preferably, the metal oxide content of the catalyst falls between 0.2 and 0.8, more preferably between 0.3 and 0.5 in terms of the ratio by weight of the metal oxide to the total of alumina and the metal oxide in the catalyst.

One preferred method for producing the catalyst for use in the invention is described.

First, prepared is an aqueous solution comprising water-soluble salts of the three constituent components, copper, aluminium and a metal to be the metal oxide. Next, this is hydrolyzed with an alkali such as aqueous ammonia or the like to give a gel-like substance or a solid precipitate, from which is removed excess water. The resulting gel-like substance or solid precipitate is finally dried and calcined to give the catalyst of the invention. For example, $Cu(NO_3)_2 \cdot 3H_2O$, $Al(NO_3)_3 \cdot 9H_2O$ and $Zn(NO_3)_2 \cdot 6H_2O$ are dissolved in water to give an aqueous mixed solution, to which is dropwise added aqueous ammonia for hydrolysis at pH of from 6 to 10, preferably from 7 to 8. The resulting gel-like substance is taken out through filtration, washed with distilled water or the like, then dried at 80 to 200° C. for 1 to 20 hours, and finally calcined at 300 to 900° C., preferably at 400 to 600° C. for 1 to 20 hours to obtain the intended catalyst. If the calcination temperature is too low or if the calcination time is too short, the catalyst could not be calcined to a satisfactory degree and the formation of the active species would be unsatisfactory. If, on the other hand, the calcination temperature is too high, in particular, if the dried solid is calcined too long at such a high temperature, the active ingredients will unfavorably aggregate to give less active catalysts.

The illustrated embodiment is to produce a catalyst comprising copper alumina and zinc oxide. For other cases comprising, as the metal oxide, chromium or magnesium oxide, used are starting materials of $Cu(NO_3)_2 \cdot 3H_2O$, $Al(NO_3)_3 \cdot 9H_2O$ and $Cr(NO_3)_3 \cdot 6H_2O$, or $Cu(NO_3)_2 \cdot 3H_2O$, $Al(NO_3)_3 \cdot 9H_2O$ and $Mg(NO_3)_2 \cdot 6H_2O$.

The starting materials for the components of the catalyst may be salts or the like that are soluble in water by themselves or are soluble in water in the presence of an acid or the like. Generally employed are nitrates, chlorides and the like with no problem. For example, for copper salts, employable are copper sulfate, copper chloride, copper acetate, basic copper carbonate and the like, in addition to copper nitrate noted above. For aluminium compounds, usable are aluminium sulfate, aluminium chloride, aluminium carbonate and the like, in addition to aluminium nitrate. For zinc compounds, employable are zinc sulfate, zinc chloride, zinc carbonate and the like, in addition to zinc nitrate. For chromium compounds, employable are chromium sulfate, chromium chloride, chromium carbonate and the like, in addition to chromium nitrate. For magnesium compounds, employable are aluminum sulfate, magnesium chloride, magnesium carbonate and the like, in addition to magnesium nitrate.

Next mentioned is Co conversion with steam and oxygen in the presence of the catalyst.

Preferably, the catalyst is reduced prior to the reaction. The reduction may be effected in hydrogen or in a gas stream containing hydrogen, at 300 to 900° C. for 0.5 to 10 hours. In general, the catalyst is heated up to a predetermined temperature and kept at the elevated temperature for a predetermined period of time, with hydrogen or hydrogen-containing gas being passed therethrough.

The reaction system for the CO conversion is not specifically defined, and employable is any of a fixed bed system, a moving bed system, a fluidized bed system or the like. Generally used is a fixed bed-type tubular reactor.

The reaction temperature may fall between 100 and 350° C., but preferably between 150 and 250° C., more preferably between 150 and 200° C.

The reaction pressure is not specifically defined. In general, it may be settled, depending on the use of the produced gas. For example, in producing hydrogen for petroleum refining, the reaction pressure is preferably around 20 kg/cm$^2$G or so. In producing hydrogen for ammonia production, it preferably falls between 20 kg/cm$^2$G and 60 kg/cm$^2$G or so. Further, in producing hydrogen for fuel cells or fuel gas, it preferably falls between 0 kg/cm$^2$G and 10 kg/cm$^2$G. In general, the reaction pressure may fall between 0 kg/cm$^2$G and 60 kg/cm$^2$G, but preferably between 0 kg/cm$^2$G and 25 kg/cm$^2$G.

In the flow reaction through a fixed bed, the gas hourly space velocity (GHSV) of the flow gas preferably falls between 1,000 h$^{-1}$ and 80,000 h$^{-1}$, more preferably between 1,000 h$^{-1}$ and 10,000 h$^{-1}$.

Preferably, the oxygen content of the feedstock gas falls between 0.04 and 3.1%, the CO content thereof falls between 0.15 and 20%, and the steam content thereof falls between 12.5 and 37.5%. If the oxygen concentration in the feedstock gas is too small, sufficient CO conversion could not occur. If, on the other hand, the oxygen concentration is too large, the exothermic reaction would be too great, and, in addition, hydrogen decreases while $CO_2$ and steam generation increases. Therefore, the operation in too much oxygen is inefficient. The CO concentration may vary in a broad range, but is preferably larger than 1% for efficient CO conversion. Even if the CO concentration is smaller than the defined range, CO conversion may occur, but the effect of oxygen added will be low. However, if the CO concentration is too large, the degree of CO conversion could not be increased to a satisfactory degree and the CO content of the produced gas could not be lowered to a satisfactory degree. The steam concentration in the feedstock gas is preferably larger, but too much steam will be of no use and is unfavorable in the economical aspect. Anyhow, the preferred concentrations of the three gaseous components constituting the feedstock gas are determined relatively to each other, while depending on the composition of the intended final gas.

Being different from the conventional CO conversion method noted above, the CO conversion method of the invention does not require the two steps of high-temperature shift reaction and low-temperature shift reaction, and does not require any additional step of carbon dioxide removal between the step of high-temperature shift reaction and the step of low-temperature shift reaction. In the CO conversion method of the invention, the CO content of the feedstock gas may vary in a broad range and the feedstock gas could be subjected to efficient CO conversion in one step. (As the case may be, the CO conversion method of the invention may be combined with a part or all of the plural steps noted above.) When combined with steam reforming of hydrocarbons or methanol, the CO conversion method of the invention is favorably applied to the production of high-purity hydrogen for industrial use and to the production of low-CO hydrogen for fuel cells.

The invention is described in more detail with reference to the following Examples, which, however, are not intended to restrict the scope of the invention.

(1) Catalyst Preparation:

EXAMPLE 1

11.4 g of Cu (NO$_3$)$_2$.3H$_2$O, 10.2 g of Al (NO$_3$)$_3$.9H$_2$O and 30.9 g of Zn(NO$_3$)$_2$.6H$_2$O were dissolved in 500 ml of distilled water at 60° C. with stirring. Still stirring it, aqueous 28% ammonia was dropwise added to the resulting aqueous solution until the pH of the solution reached 7 to 8. The gel-like substance thus formed was taken out through filtration, washed with 10 to 30 ml of distilled water, and then dried in a drier at 100° C. for 12 hours. Next, the dried solid was heated up to 500° C. in an electric furnace over a period of 2 hours, and then kept therein at 500° C. for further 3 hours to obtain a catalyst 1. The composition and the physical properties of the catalyst 1 are shown in Table 1.

EXAMPLE 2

A catalyst 2 was prepared in the same manner as in Example 1, except that 11.4 g of Cu(NO$_3$)$_2$.3H$_2$O, 20.1 g of Al(NO$_3$)$_3$.9H$_2$O and 22.1 g of Cr (NO$_3$)$_2$.6H$_2$O were used herein as the starting metal salts in place of Cu (NO$_3$)$_2$.3H$_2$O, Al (NO$_3$)$_3$.9H$_2$O and Zn (NO$_3$)$_2$.6H$_2$O used in Example 1. The composition and the physical properties of the catalyst 2 are shown in Table 1.

EXAMPLE 3

A catalyst 3 was prepared in the same manner as in Example 1, except that 11.4 g of Cu(NO$_3$)$_2$.3H$_2$O, 28.8 g of Al(NO$_3$)$_3$.9H$_2$O and 19.7 g of Mg (NO$_3$)$_2$.6H$_2$O were used herein as the starting metal salts in place of Cu(NO$_3$)$_2$.3H$_2$O, Al(NO$_3$)$_3$.9H$_2$O and Zn(NO$_3$)$_2$.6H$_2$O used in Example 1. The composition and the physical properties of the catalyst 3 are shown in Table 1.

COMPARATIVE EXAMPLE 1

A catalyst 4 was prepared in the same manner as in Example 1, except that Cu(NO$_3$)$_2$.3H$_2$O, Cr(NO$_3$)$_3$.6H$_2$O and Zn(NO$_3$)$_2$.6H$_2$O were used herein as the starting metal salts in place of Cu (NO$_3$)$_2$.3HO, Al(NO$_3$)$_3$.9H$_2$O and Zn (NO$_3$)$_2$.6H$_2$O used in Example 1. The composition and the physical properties of the catalyst 4 are shown in Table 1.

(2) CO Conversion:

EXAMPLE 4, EXAMPLE 5 AND COMPARATIVE EXAMPLE 2

Prior to the reaction, the catalyst 1 was powdered in a crucible, pelletized under a pressure of 200 to 300 kg/cm$^2$, and dressed into 20-mesh pass pellets. The resulting catalyst pellets were charged into a fixed bed flow reactor, and reduced in a mixed gas stream of hydrogen/nitrogen (75/25) at 400° C. for 1 hour to prepare a reduced catalyst. With the reduced catalyst being still in the fixed bed flow reactor, a feedstock gas shown in Table 2 was subjected to CO conversion under the condition also shown therein. In Example 4, Example 5 and Comparative Example 2, the oxygen concentration in the feedstock gas to be processed was varied as in Table 2. FIG. 1 shows the temperature-dependent CO conversion versus the varying oxygen concentration in those Example 4, Example 5 and Comparative Example 2.

EXAMPLE 6

Figure 2:
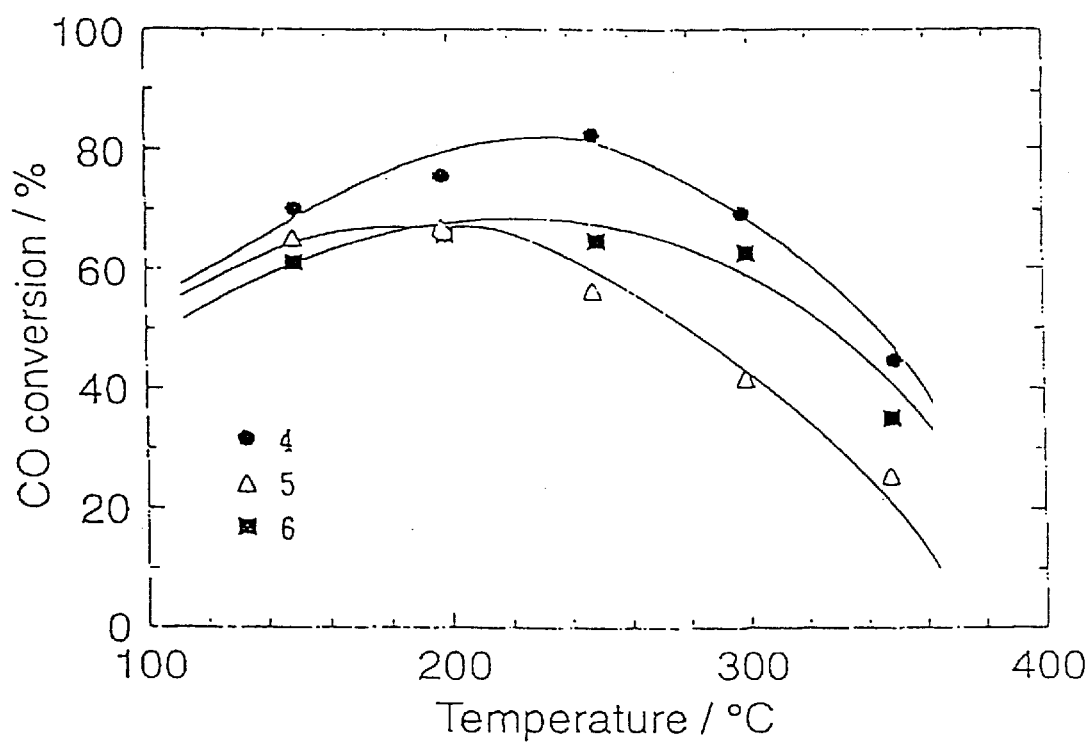
FIG. 2 is a graph of a temperature-dependent CO conversion versus different catalysts used. This shows the data in Example 6.

In the same manner as in Example 4, prepared were reduced catalysts from catalyst 1, catalyst 2 and catalyst 3. With each reduced catalyst being in the fixed bed flow reactor, a feedstock gas shown in Table 2 was subjected to CO conversion under the condition also shown therein. FIG. 2 shows the temperature-dependent CO conversion versus different catalysts used.

EXAMPLE 7 AND COMPARATIVE EXAMPLE 3

In the same manner as in Example 4, prepared were reduced catalysts from catalyst 1, catalyst 2, catalyst 3 and catalyst 4. With each reduced catalyst being in the fixed bed flow reactor, a feedstock gas was subjected to CO conversion. The feedstock gas processed herein was comprised of 37.5% of hydrogen, 1.25% of carbon monoxide, 25% of steam, 12.5% of carbon dioxide and 0.63% of oxygen with the balance being nitrogen. Regarding the CO conversion condition, the reaction pressure was atmospheric pressure, and the space velocity (GHSV) was 6400 $h^{-1}$. Table 3 shows the temperature-dependent CO conversion versus different catalysts used.

TABLE 1

Composition and Physical Properties of Catalysts

| Catalyst (production method) | | Catalyst 1 Example 1 | Catalyst 2 Example 2 | Catalyst 3 Example 3 | Catalyst 4 Comparative Example 1 |
|---|---|---|---|---|---|
| Composition (wt. %) | Cu | 30 | 30 | 30 | 30 |
| | $Al_2O_3$ | 42 | 28 | 39 | |
| | ZnO | 28 | | | 36 |
| | $Cr_2O_3$ | | 42 | | 34 |
| | MgO | | | 31 | |
| | MO/($Al_2O_3$ + MO) | 0.40 | 0.60 | 0.44 | — |
| Physical Properties | Specific Surface Area ($m^2$/g) | 114 | 76 | 131 | 16 |

* MO is any of ZnO, $Cr_2O_3$ or MgO. The ratio is by weight.

TABLE 2

Condition for CO Conversion

| Items | | Example 4 | Example 5 | Comparative Example 2 | Example 6 |
|---|---|---|---|---|---|
| Composition of Feedstock Gas (mol %) | Carbon monoxide | 1.2 | 12.5 | 12.5 | 1.25 |
| | Steam | 25 | 25 | 25 | 25 |
| | Oxygen | 0.3 | 3.1 | 0 | 0.63 |
| | Hydrogen | 12.5 | 12.5 | 12.5 | 37.5 |
| | Carbon dioxide | 0 | 0 | 0 | 12.5 |
| | Nitrogen | 61 | 46.9 | 50 | 23.12 |
| Reaction Pressure (kg/$cm^2$) | | 1.0 | 1.0 | 1.0 | 1.0 |
| Space Velocity (GHSV) ($h^{-1}$) | | 7200 | 7200 | 7200 | 6400 |
| Reaction Temperature | | as in FIG. | as in FIG. | as in FIG. | as in FIG. |

TABLE 3

Data in CO Conversion (%)

| Reaction temperature | 150° C. | 200° C. | 250° C. | 300° C. |
|---|---|---|---|---|
| Catalyst 1 (Example 7) | 73 | 83 | 80 | 64 |
| Catalyst 2 (Example 7) | 65 | 67 | 56 | 41 |
| Catalyst 3 (Example 7) | 61 | 66 | 65 | 57 |
| Catalyst 4 (Comparative Example 3) | 3 | 67 | 63 | 52 |

As in FIG. 1, it is understood that CO conversion in the oxygen-added feedstock gas according to the method of the invention is higher than that in the feedstock gas with no oxygen. As in FIG. 2, it is understood that the catalysts of the invention are all favorable to CO conversion in different conditions. As in Table 3, it is understood that CO conversion in the presence of the catalyst of the invention at low temperatures is higher than that in the presence of the other catalyst.

The copper-based catalyst of the invention is highly active for oxidation with oxygen-containing steam of CO in gases such as hydrogen gas in which the CO concentration varies in a broad range, and enables high-efficiency CO conversion into hydrogen and carbon dioxide.

What is claimed is:

1. A method of converting carbon monoxide and steam into hydrogen and carbon dioxide, which comprises contacting carbon monoxide with steam and oxygen in the presence of a catalyst that contains copper, alumina and at least one metal oxide selected from the group of consisting of zinc oxide, chromium oxide and magnesium oxide.

2. The method of claim 1, wherein said contacting is carried out at a temperature of 100–350° C.

3. The method of claim 1, wherein said contacting is carried out at a temperature of 150–200° C.

4. The method of claim 1, wherein said contacting is carried out at a pressure of 0–25 kg/$cm^2$ G.

5. The method of claim 1, wherein said oxygen has a concentration of 0.04–3.1% before said conversion.

6. The method of claim 1, wherein said carbon monoxide has a concentration of 0.15–20% before said conversion.

7. The method of claim 1, wherein said steam has a concentration of 12.5–37.5% before said conversion.

8. The method of claim 1, wherein said catalyst has a copper concentration of 25–35% based on the total weight of said catalyst.

9. The method of claim 1, the ratio of said metal oxide t'the total of said alumina and said metal oxide in the catalyst is 0.3–0.5.

10. A method for producing hydrogen-rich gas with a reduced carbon monoxide content, which comprises containing a carbon monoxide-containing, hydrogen-rich gas with steam and oxygen in the presence of a catalyst that contains copper, alumina and at least one metal oxide selected from the group consisting of zinc oxide, chromium oxide and magnesium oxide.

11. The method of claim 10, wherein said contacting is carried out at a temperature of 100–350° C.

12. The method of claim 11, wherein said contacting is carried out at a temperature of 150–200° C.

13. The method of claim 10, wherein said contacting is carried out at a pressure of 0–25 kg/$cm^2$ G.

14. The method of claim 10, wherein said oxygen has a concentration of 0.04–3.1% before said conversion.

15. The method of claim 10, wherein said carbon monoxide has a concentration of 0.15–20% before said conversion.

16. The method of claim 10, wherein said steam has a concentration of 12.5–37.5% before said conversion.

17. The method of claim 10, wherein said catalyst has a copper concentration of 25–35%, based on the total weight of said catalyst.

18. The method of claim 10, the ratio of said metal oxide to the total of said alumina and said metal oxide in the catalyst is 0.3–0.5.

* * * * *